(12) United States Patent
Jones et al.

(10) Patent No.: US 6,840,612 B2
(45) Date of Patent: Jan. 11, 2005

(54) GUIDE FOR SOLID INK STICK FEED

(75) Inventors: Brent R. Jones, Tualatin, OR (US); Frederick T. Mattern, Portland, OR (US)

(73) Assignee: Xerox Corporation, Stamford, CT (US)

( * ) Notice: Subject to any disclaimer, the term of this patent is extended or adjusted under 35 U.S.C. 154(b) by 160 days.

(21) Appl. No.: 10/135,051

(22) Filed: Apr. 29, 2002

(65) Prior Publication Data

US 2003/0202067 A1 Oct. 30, 2003

(51) Int. Cl.[7] .............................. B41J 2/175; B41J 2/17; G01D 11/00
(52) U.S. Cl. .............................. 347/88; 347/99; 347/84; 347/85; 347/95
(58) Field of Search .............................. 347/88, 99, 84, 347/85, 95

(56) References Cited

U.S. PATENT DOCUMENTS

| | | | | |
|---|---|---|---|---|
| 5,223,860 A | * | 6/1993 | Loofbourow et al. | 347/88 |
| 5,455,604 A | | 10/1995 | Adams et al. | 346/138 |
| 5,734,402 A | | 3/1998 | Rousseau et al. | 347/88 |
| 5,805,191 A | | 9/1998 | Jones et al. | 347/103 |
| 5,861,903 A | | 1/1999 | Crawford et al. | 347/88 |
| D407,112 S | * | 3/1999 | Chin et al. | D18/56 |
| 6,053,608 A | * | 4/2000 | Ishii et al. | 347/88 |
| 6,254,228 B1 | | 7/2001 | Sago | 347/88 |

OTHER PUBLICATIONS

Jones et al., "Guide for Solid Ink Stick Feed," U.S. patent application Ser. No. 10/136,078 (Attorney Docket No. D/A1664Q), filed concurrently herewith.
Jones, "Guide for Solid Ink Stick Feed," U.S. patent application Ser. No. 10/135,077 (Attorney Docket No. D/A2010), filed concurrently herewith.
Jones et al., "Feed Guidance and Identification for Ink Stick," U.S. patent application Ser. No. 10/135,156 (Attorney Docket No. D/A2010Q2), filed concurrently herewith.
Jones et al., "Channel Keying for Solid Ink Stick Feed," U.S. patent application Ser. No. 10/135,038 (Attorney Docket No. D/A2031), filed concurrently herewith.

* cited by examiner

Primary Examiner—Leonard S Liang
(74) Attorney, Agent, or Firm—David J. Arthur

(57) ABSTRACT

An ink stick for a phase change ink jet printer has a guide element formed in one portion of the ink stick body (such as the lower portion) for engaging a feed channel guide rail in a feed channel of a solid ink feed system of the printer. The guide element is substantially offset from the lateral center of gravity of the ink stick body. The guide element engages a feed channel guide rail in the printer. The teed channel guide rail is substantially narrower than the width of the feed channel. A second guide element is formed on the opposite side of the lateral center of gravity of the ink stick body. The second guide element engages a second feed channel guide rail in the feed channel.

28 Claims, 12 Drawing Sheets

GUIDE FOR SOLID INK STICK FEED

CROSS-REFERENCE TO RELATED APPLICATIONS

Reference is made to commonly-assigned copending U.S. patent application Ser. No. 10/135,078, filed concurrently herewith, entitled "Guide For Solid ink Stick Feed," by Jones et al., U.S. patent application Ser. No. 10/135,077, filed concurrently herewith, entitled "Guide For Solid ink Stick Feed," by Jones, U.S. patent application Ser. No. 10/135,078, filed concurrently herewith, entitled "Feed Guidance and identification for ink Stick," by Jones et al., and U.S. patent application Ser. No. 10/135,038, filed concurrently herewith, entitled "Channel Keying for Solid ink Stick Feed," by Jones et al., the disclosures of which are incorporated herein.

The present invention relates generally to ink printers, the ink used in such ink printers, and the apparatus and method for feeding the ink into the printer.

BACKGROUND

Solid ink or phase change ink printers conventionally receive ink in a solid form, either as pellets or as ink sticks. A feed mechanism delivers the solid ink to a heater assembly, where the ink is melted into a liquid state for jetting onto a receiving medium.

Solid ink or phase change ink printers conventionally receive ink in a solid form and convert the ink to a liquid form for jetting onto a receiving medium. The printer receives the solid ink either as pellets or as ink sticks in a feed channel. With solid ink sticks, the solid ink sticks are either gravity fed or spring loaded through the feed channel toward a heater plate. The heater plate melts the solid ink into its liquid form in a printer that receives solid ink sticks, the sticks are either gravity fed or spring loaded into a feed channel and pressed against a heater plate to melt the solid ink into its liquid form. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

SUMMARY

A solid ink feed system for a phase change ink jet printer, an ink stick appropriate for use in such a solid ink feed system, include guide elements for guiding ink sticks along a feed channel of an ink stick feed system. A method of loading an ink stick into a solid ink feed system includes aligning a guide element in an ink stick with a feed channel of the solid ink feed system.

The solid ink feed system includes one or more longitudinal feed channels, each of which has a feed channel guide rail in the lower portion thereof. The width of the feed channel guide rail is substantially less than the width of the feed channel, and the guide rail is substantially offset from the center of the feed channel. A second feed channel guide rail is provided in an upper portion of the feed channel. The second guide rail is offset from the center of the feed channel, on the opposite side of the center of the feed channel from the first guide rail.

An ink stick for use in the solid ink feed system has at least a bottom surface, and includes a longitudinal guide element substantially adjacent to one side of the ink stick. The shape of the guide element in the ink stick and the shape of the guide rail in the feed channel substantially complement one another so that the ink stick guide element slidingly engages the guide rail of the feed channel. In a particular implementation, the ink stick guide element is formed as part of the bottom surface of the ink stick.

A method of loading a solid ink feed system includes providing an ink stick that has a bottom surface, a lateral center of gravity, and a guide element formedin the bottom surface, in which the guide element is laterally offset from the lateral center of gravity of the ink stick. The method further includes aligning the guide element of the ink stick with a feed channel guide rail in the feed system, and inserting the ink stick into the feed system. The method further includes resting the guide element on the feed channel guide rail so the guide element and the feed channel guide rail is substantially the only contact between the bottom surface of the ink stick and the feed system.

An ink stick for use in the solid ink feed system of a phase change ink jet printer includes a three dimensional ink stick body with a lateral center of gravity, and a guide element formed in the ink stick body, offset from the lateral center of gravity, for guiding the ink stick in the sold ink feed system.

THE DRAWINGS

DETAILED DESCRIPTION

Figure 1:
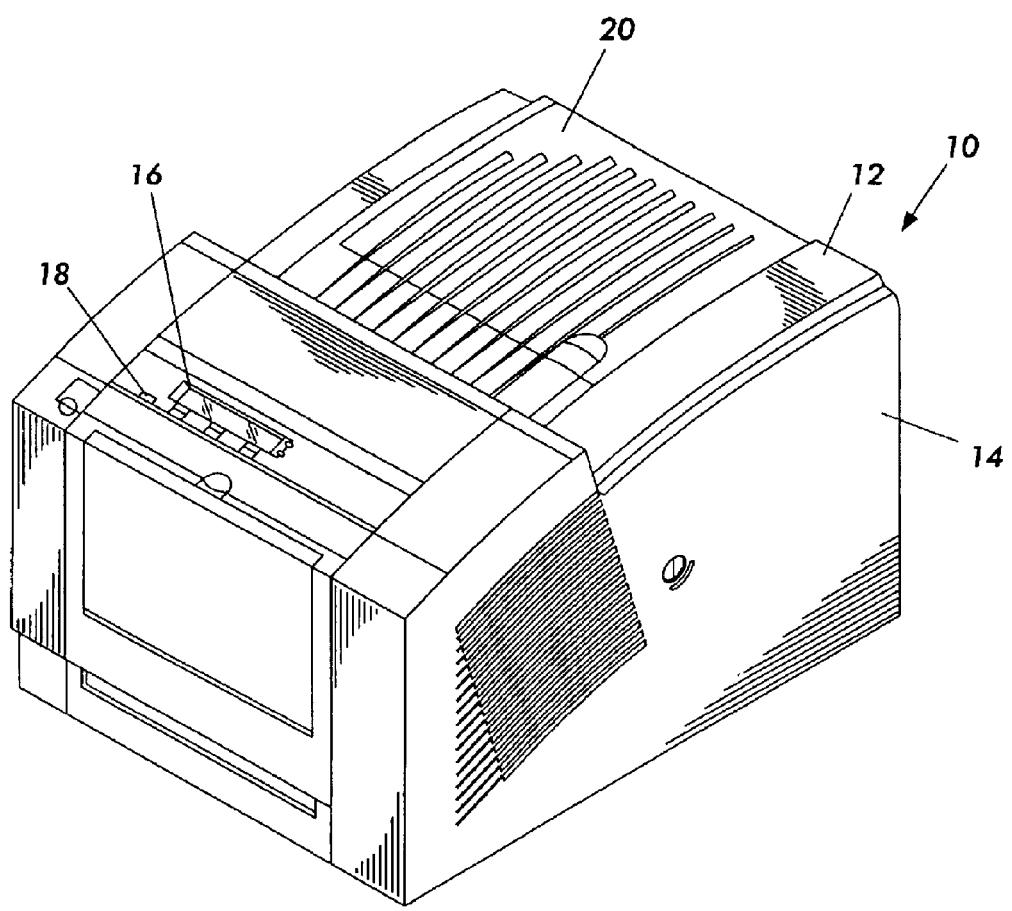
FIG. 1 is a perspective view of a phase change printer with the printer ink access cover closed.
Figure 2:
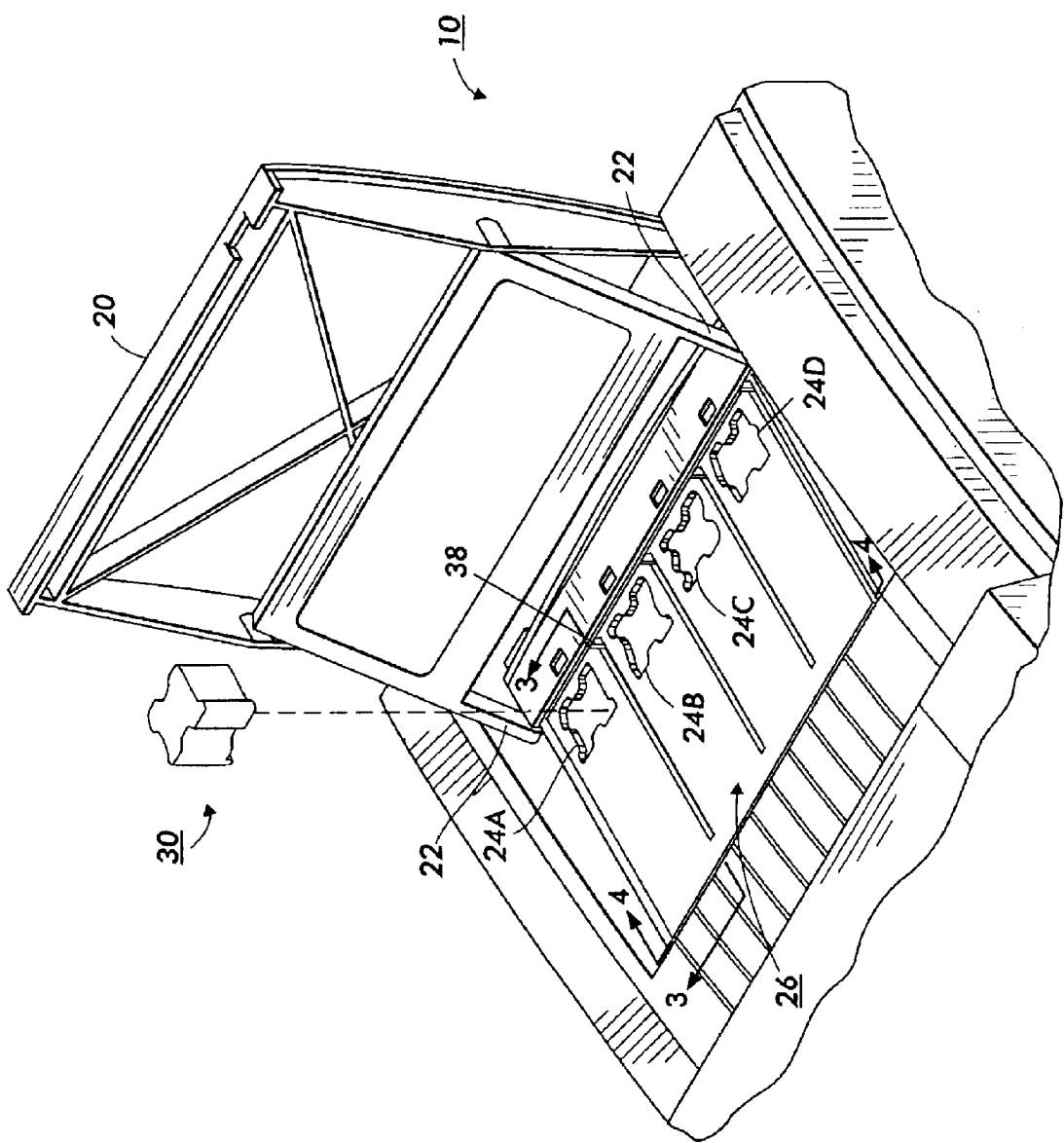
FIG. 2 is an enlarged partial top perspective view of the phase change printer with the ink access cover open, showing a solid ink stick in position to be loaded into a feed channel.

FIG. 1 shows a solid ink, or phase change, ink printer 10 that includes an outer housing having a top surface 12 and side surfaces 14. A user interface, such as a front panel display screen 16, displays information concerning the status of the printer, and user instructions. Buttons 18 or other control elements for controlling operation of the printer are adjacent the user interface window, or may be at other locations on the printer. An ink jet printing mechanism (not shown) is contained inside the housing. Such a printing mechanism is described in U.S. Pat. No. 5,805,191, entitled Surface Application System, to Jones et al., and U.S. Pat. No. 5,455,604, entitled Ink Jet Printer Architecture and Method, to Adams et al. An ink feed system delivers ink to the printing mechanism. The ink feed system is contained under the top surface of the printer housing. The top surface of the housing includes a hinged ink access cover 20 that opens as shown in FIG. 2, to provide the user access to the ink feed system.

In the particular printer shown, the ink access cover 20 is attached to an ink load linkage element 22 so that when the printer ink access cover 20 is raised, the ink load linkage 22 slides and pivots to an ink load position. The interaction of the ink access cover and the ink load linkage element is described in U.S. Pat. No. 5,861,903 for an Ink Feed System, issued Jan. 19, 1999 to Crawford et al., though with some differences noted below. As seen in FIG. 2, opening the ink access cover reveals a key plate 26 having keyed openings 24A, 24B, 24C, 24D. Each keyed opening 24A, 24B, 24C, 24D provides access to an insertion end of one of several individual feed channels 28A, 28B, 28C, 28D of the solid ink feed system (see FIGS. 2 and 3).

Figure 4:
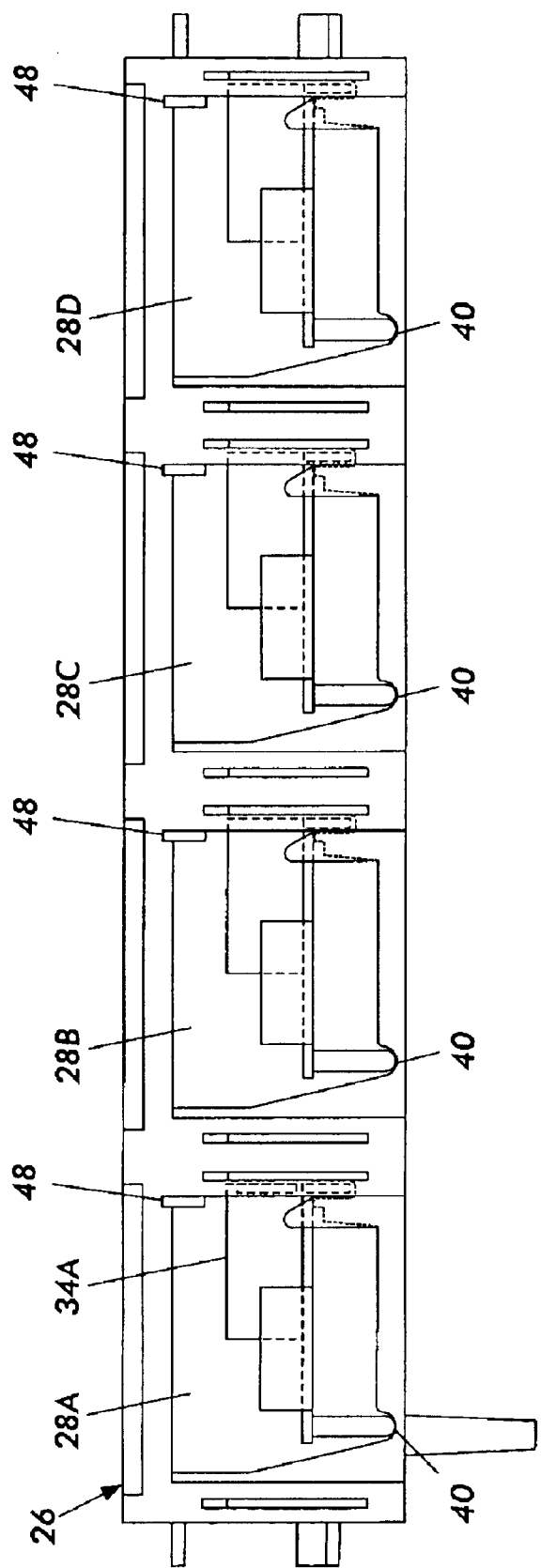
FIG. 4 is a sectional view of the ink stick feed system, taken along line 4—4 of FIG. 2.

Each longitudinal feed channel 28A, 28B, 28C, 28D delivers ink sticks 30 of one particular color to a corresponding melt plate 32. Each feed channel has a longitudinal feed direction from the insertion end of the feed channel to the melt end of the feed channel. The melt end of the feed channel is adjacent the melt plate. The melt plate melts the solid ink stick into a liquid form. The melted ink drips through a gap 33 between the melt end of the feed channel and the melt plate, and into a liquid ink reservoir (not shown). The feed channels 28A, 28B, 28C, 28D have a longitudinal dimension from the insertion end to the melt end, and a lateral dimension, substantially perpendicular to the longitudinal dimension. Each feed channel in the particular embodiment illustrated includes a push block 34A driven by a driving force or element, such as a constant force spring 36A, to push the individual ink sticks along the length of the longitudinal feed channel toward the melt plates 32 that are at the melt end of each feed channel. The tension of the constant force spring 36A drives the push block toward the melt end of the feed channel. In a manner similar to that described in U.S. Pat. No. 5,861,903, the ink load linkage 22 is coupled to a yoke 38, which is attached to the constant force spring 36A mounted in the push block 34A. The attachment to the ink load linkage 22 pulls the push block 34A toward the insertion end of the feed channel when the ink access cover is raised to reveal the key plate 26. The constant force spring 36A can be a flat spring with its face oriented along a substantially vertical axis. FIG. 4 is a cross-sectional view of the set of feed channels 28A, 28B, 28C, 28D forming the feed chute of the ink delivery system.

A color printer typically uses four colors of ink (yellow, cyan, magenta, and black). Ink sticks 30 of each color are delivered through a corresponding individual one of the feed channels 28A, 28B, 28C, 28D. The operator of the printer exercises cares to avoid inserting ink sticks of one color into a feed channel for a different color. Ink sticks may be so saturated with color dye that it may be difficult for a printer user to tell by color alone which color is which. Cyan, magenta, and black ink sticks in particular can be difficult to distinguish visually based on color appearance. The key plate 26 has keyed openings 24A, 24B, 24C, 24D to aid the printer user in ensuring that only ink sticks of the proper color are inserted into each feed channel. Each keyed opening 24A, 24B, 24C, 24D of the key plate has a unique shape. The ink sticks 30 of the color for that feed channel have a shape corresponding to the shape of the keyed opening. The keyed openings and corresponding ink stick shapes exclude from each ink feed channel ink sticks of all colors except the ink sticks of the proper color for that feed channel.

Figure 5:
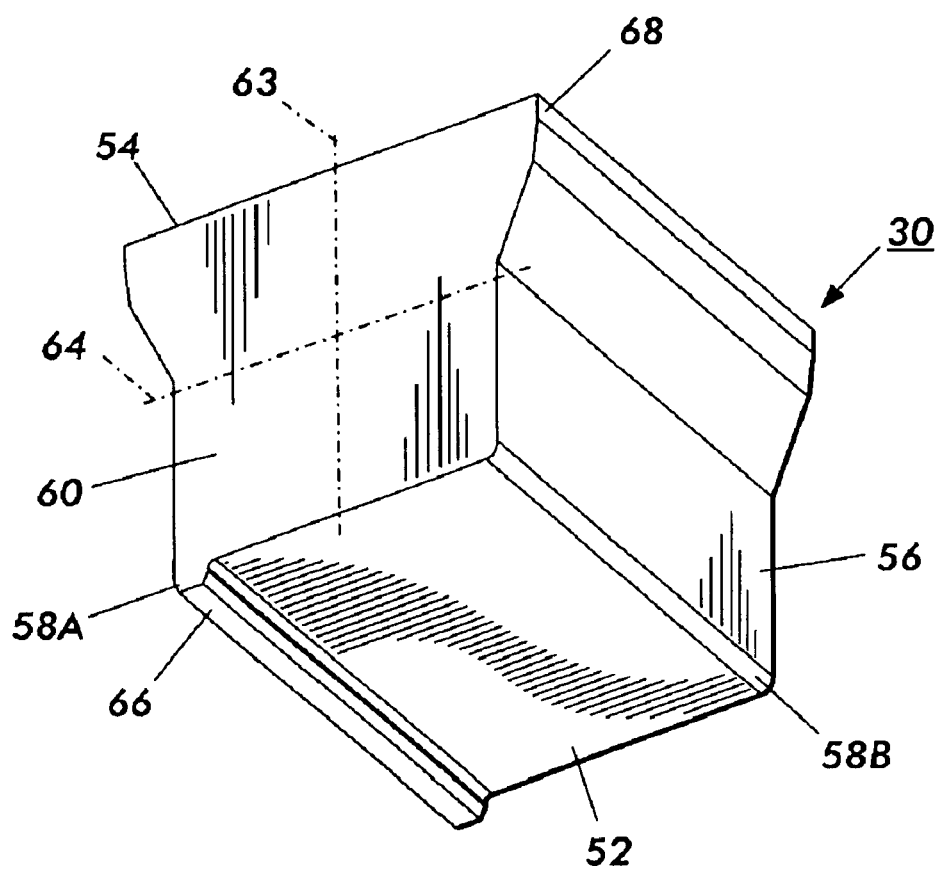
FIG. 5 is a perspective view of one embodiment of a solid ink stick.

An exemplary ink stick for use in the printer of FIGS. 1–4 is shown in perspective in FIG. 5. The ink stick illustrated is formed of a three dimensional substantially rectangular body of ink material that has a bottom, represented by a general bottom surface 52, a top, represented by a general top surface 54, and sides, represented by two general lateral side extremities or surfaces 56 and two end extremities or surfaces 60. The surfaces of the ink stick body need not be flat, nor need they be parallel or perpendicular one another, However, these descriptions will aid the reader in visualizing, even though the surfaces may have three dimensional topography, or be angled with respect to one another. In the particular somewhat cubic shape illustrated, the intersections of the bottom surface 52 and the lateral side surfaces 56 of the ink stick body form lateral edges 58A, 58B of the bottom surface. The side surfaces 56 of the illustrated embodiment are stepped or tapered so that the upper portion of the ink stick body is slightly wider than the lower portion. The side surfaces 56 may also be substantially vertical, so that the upper and lower portions of the ink stick body are of substantially equal dimensions. The ink stick is illustrated without the key shapes on the lateral sides that correspond to the key plate openings 24A, 24B, 24C, 24D through the key plate 26, to simplify the illustration.

The ink stick has a lateral center of gravity 63 between the two lateral sides 56 of the ink stick body. In the particular embodiment illustrated, the weight distribution of the ink stick body is substantially uniform (not including protruding key elements), and the ink stick body is substantially symmetrical about its lateral center (not including protruding key elements), so that the lateral center of gravity 63 is approximately at the midpoint between the lateral sides 56 of the ink stick body (not including protruding key elements). Similarly, the ink stick body has a vertical center of gravity 64 that is substantially midway between the top surface 54 of the ink stick body and the bottom surface 52 of the ink stick body.

The ink stick includes guide means for guiding the ink stick along a feed channel 28A, 24B, 28C, 28D of the solid ink feed system. A first guide element 66 formed in the ink stick body forms one portion of the ink stick guide means. The first ink stick guide element 66 is laterally offset from the lateral center of gravity 63 of the ink stick body. In this exemplary embodiment, the first guide element 66 is adjacent one of the lateral sides of the ink stick body. In the illustrated embodiment, the first ink stick guide element 66 is formed in the ink stick body as a lower ink stick guide element 66 substantially below the vertical center of gravity 64. In this exemplary embodiment, the lower guide element 66 is adjacent one of the lateral sides of the ink stick body. In the embodiment illustrated in FIG. 5, the lower ink stick guide element is formed in the bottom surface 52 of the ink stick body, and in particular is formed as a protrusion from the bottom surface of the ink stick body. This protruding guide element is formed at or near a first lateral edge 58A of the bottom surface. The protruding guide element 66 extends along the length of the ink stick body, from the leading (front) end surface to the trailing (rear) end surface. The guide element has a lateral dimension of approximately 0.12 inches (3.0 mm) and protrudes approximately 0.08–0.2 inches (2.0–5.0 mm) from the bottom surface of the ink stick body. The protruding guide element 66 tapers from its proximal base, where it joins the main ink stick body, to its distal tip. The distal tip may be somewhat rounded. The guide element encompasses no more than approximately 30% of the width of the bottom portion of the feed stick, and particularly is approximately 15% of the width of the bottom surface 52 of the ink stick.

Figure 6:
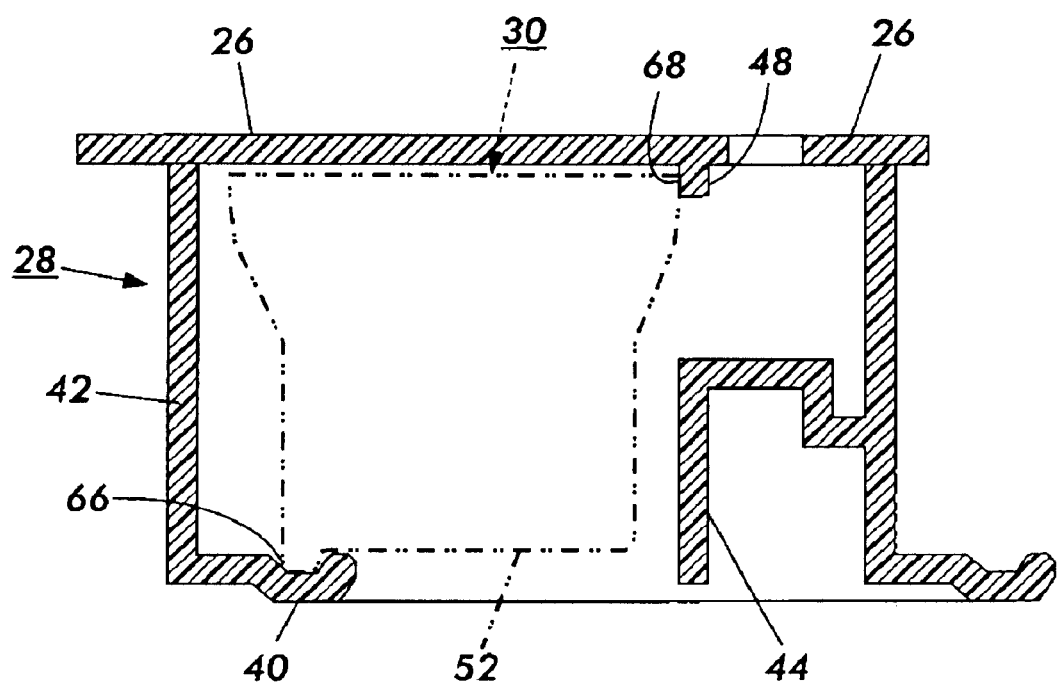
FIG. 6 is a simplified cross-sectional view of a feed channel taken along line 6—6 of FIG. 3.

FIG. 6 shows a cross sectional view of a particular embodiment of the longitudinal feed channel 28 of the solid ink feed system. The feed channel includes a feed channel guide rail 40 positioned in a lower portion of the feed channel. This feed channel guide rail 40 provides feed system guide means for guiding the ink stick 30 in the feed channel. The first ink stick guide element 66 interacts with a first portion of the feed channel, and in particular the feed channel guide rail 40, to guide the ink stick along the feed channel 28. The feed channel guide rail 40 of the solid ink feed system and the first guide element 66 formed in the ink stick body are compatible with one another, and for example, have complementary shapes. The complementary shapes allow the lower guide element 66 of the ink stick body to slidingly engage the feed channel guide rail 40 of the ink stick feed channel 28.

The width of the feed channel guide rail 40 is substantially less than the width of the feed channel. A majority of the bottom of the feed channel is recessed or open, so that it does not contact the bottom surface 52 of the ink stick 30. The recessed or open bottom of the feed channel allows flakes or chips of the ink stick material to fall away, so that such flakes or chips do not interfere with the sliding movement of the ink stick along the feed channel. The guide rail encompasses less than 30%, and particularly 5%–25%, and more particularly approximately 15% of the width of the feed channel.

The feed channel guide rail 40 is suspended from a first side wall 42 of the feed channel. A second side wall 44 is on the opposite side of the feed channel. The side walls 42, 44 need not be solid, as the side surfaces 56 of the ink stick do not slide along them. Partial side walls may be a advantageous in reducing the weight of the ink feed system. Certain environments can suggest having the guide rail 40 supported by a structure rising from the bottom of the ink feed system, rather than suspended from the side wall.

The weight of the ink stick body provides a vertical force to the interaction between the ink stick body guide element 66 and the feed channel guide rail 40 of the ink stick feed system. With the guide element of the ink stick body significantly offset laterally from the lateral center of gravity of the ink stick body, the ink stick body in the feed channel tends to rotate about a pivot point formed by the engagement of the ink stick guide element with the feed channel guide rail. The feed channel guide rail provides sufficient lateral resistance to movement of the ink stick guide element 66 that the ink stick guide element 66 remains in the feed channel guide rail 40.

The ink stick body additionally includes a second ink stick guide element 68 that guides another portion of the ink stick body along another portion of the feed channel, such as a second, upper guide rail 48 in the feed channel. The upper ink stick guide element 68 forms an additional portion of the ink stick guide means. The second ink stick guide element 68 is formed on the opposite side of the lateral center of gravity 63 from the first ink stick guide element 66. In the illustrated embodiment, the second ink stick guide element is formed in the ink stick body above the vertical center of gravity 64 of the ink stick body. Further, the second ink stick upper guide element is formed of a portion of the lateral side surface 56 of the ink stick body. For example, the second ink stick guide element is that upper portion of the lateral side surface adjacent the intersection of the lateral side surface 56 with the top surface 54 of the ink stick body. If at least the upper portions of the side surfaces 56 of the ink stick body are substantially vertical, the intersection of the lateral side surface with the top surface forms substantially a right angle. Alternatively, the lateral side surfaces (or at least at the upper portions thereof) may be angled or segmented to provide a protruding portion of the lateral side wall as the upper guide element.

As seen in FIG. 6, the upper ink stick guide element 68 slidingly engages the upper feed channel guide rail 48 of the solid ink feed system. The upper feed channel guide rail can be formed as part of the key plate 26 that covers the feed channel (as shown in FIG. 6), or as a part of the feed channel body. The upper feed channel guide rail 48 is positioned so that the upper ink stick guide element 68 exerts a slight lateral force on the upper guide rail 48. Those skilled in the art will recognize that the upper ink stick guide element can take on other forms than these specific shapes illustrated.

The longitudinal ink stick guide element 66 in the bottom surface of the ink stick body and the feed channel guide rail 40 cooperate to maintain the orientation of the ink stick as the ink stick progresses along the length of the feed channel from the feed end to the melt end. The ink stick guide element 66 and the feed channel guide rail 40 forming the guide means keep the ink stick aligned with the feed channel. The ink stick body does not become skewed with respect to the feed channel. With the ink stick properly aligned with the feed channel, the ink stick meets the melt plate 32 normal to the melt plate surface. Proper alignment between the ink stick and the melt plate enhances even melting of the ink stick. Even melting reduces the formation of unmelted corner slivers at the trailing end of each ink stick. Such unmelted corner slivers may slip through the gap 33 between the melt plate and the end of the feed channel. Such slivers may interfere with the proper functioning of certain portions of the printer.

The ink stick is guided along the feed channel 28 with only two lines of contact between the ink stick body and the feed channel—the lower ink stick guide element 66 contacting the lower feed channel guide rail 40, and the upper ink stick guide element 68 contacting the upper feed channel guide rail 48. This arrangement provides greater accuracy in guiding the ink stick along the feed channel, so that the ink stick retains its orientation in the feed channel as the ink stick progresses toward the melt plate 32. Guiding the ink stick to maintain its alignment in the feed channel also prevents jamming due to skewing of the ink stick as it moves along the feed channel. These lines of contact may be discontinuous if the ink stick guide elements are discontinuous.

In certain implementations of the ink stick, the lower guide element 66 is formed slightly spaced from the lateral edge 58A of the ink stick body. This spacing reduces the stress on the guide element that might tend to cause portions of the guide element or adjacent portions of the ink stick body to break off.

Key element shapes in the lateral side surfaces 56 of the ink stick body may tend to affect the orientation of the ink stick body as the ink stick moves along the feed channel. The interaction of the guide element 66 and the guide rail 40 counteracts that tendency, and maintains the correct orientation of the ink stick in the feed channel. The cooperative action of the ink stick guide element 66 and the feed channel guide rail 40 also reduce the "steering" effect the push block 34 acting on the trailing end surface of the ink stick in the feed channel 28. Thus, laterally offset pressure by the ink block is of lesser concern, and maintaining a perfect lateral balance of the force exerted by the push block on the ink stick is less critical than with certain other designs.

Figure 7:
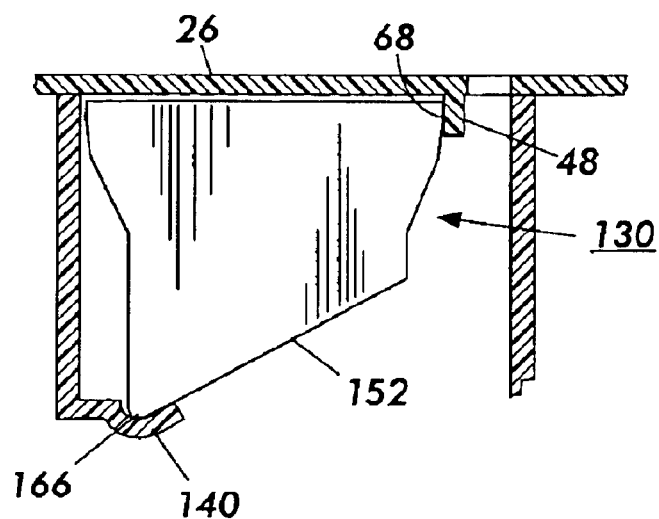
FIG. 7 is a simplified cross-sectional view of another embodiment of a feed channel, with another embodiment of a solid ink stick.

FIGS. 7 through 18 show ink sticks having alternative shapes for the ink stick guide element. As seen in FIG. 7, the bottom surface of the ink stick body need not be horizontal. In this embodiment, the bottom surface 152 of the ink stick 130 is angled diagonally, and the ink stick guide element 166 is formed by the angular intersection of the bottom surface 152 with the lateral side surface 56 of the ink stick body. The printer feed system includes a feed channel guide rail 140 that has a shape complementary to the shape of the ink stick guide element 166 so that the ink stick guide element slidingly engages the feed channel guide rail. The second, upper guide element 68 of the ink stick slidingly engages the second, upper feed channel guide rail 48. The upper feed channel guide rail 48 is illustrated as formed as part of the feed channel frame. However, as noted above, the upper feed channel guide rail 48 can also be formed as part of the key plate 26.

Figure 8:
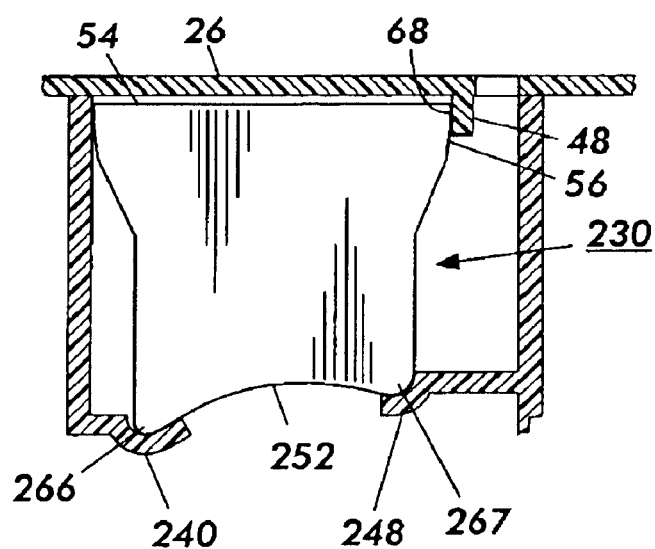
FIG. 8 is a simplified cross-sectional view of another embodiment of a feed channel, with another embodiment of a solid ink stick.

FIG. 8 illustrates an ink stick 230 in which the bottom surface of the ink stick body is curved, rather than flat. With the particular shape to the bottom surface 252 shown in FIG. 8, a second guide element 267 can be formed in the bottom surface of the ink stick body, on the side opposite from the first lower guide element 266. This second lower guide element can be in lieu of, or in addition to, the upper guide element 68 formed in the upper portion of the ink stick body. An ink stick feed channel for receiving an ink stick with such second lower guide element 267 has a second guide rail 248 in the lower portion of the feed channel for slidingly engaging the second lower guide element. This second lower guide rail 248 is substantially similar to the first lower guide rail 240. Although the illustration of FIG. 8 includes both a second lower ink stick guide element 267 interacting with a second lower feed channel guide rail 248 and an upper ink stick guide element 68 interacting with an upper feed channel guide rail 48, in most uses only one of those interactions is needed to guide the ink stick along the feed channel. The ink stick of FIG. 8 need not use the second lower guide element 267, using only the upper guide element 68 to balance the interaction between the lower guide element 266 and the feed channel guide rail. In such an implementation, substantially the only contact between the lower portion of the ink stick and the feed channel is the contact between the lower guide element 266 and the single feed channel guide rail 240 in the feed channel in an alternative, the two lower ink stick guide elements 266, 267 each interact with the lower feed channel guide rails 240, 248, and the upper guide rail 48 is eliminated.

Figure 9:
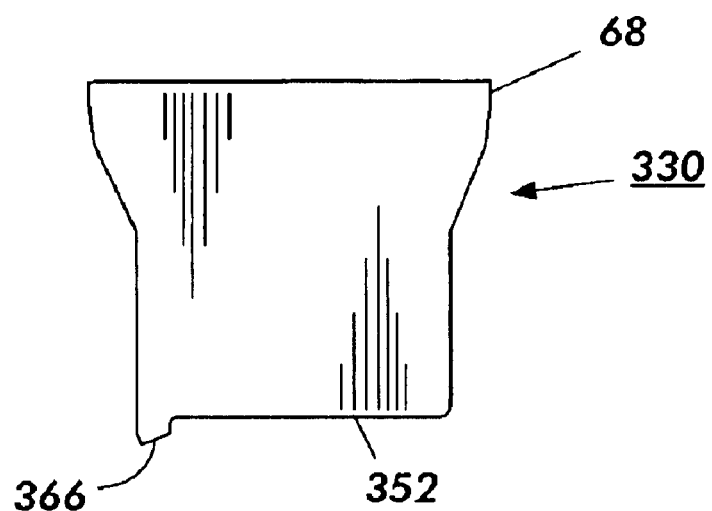
FIG. 9 is an end elevational view of yet another embodiment of an ink stick.
Figure 10:
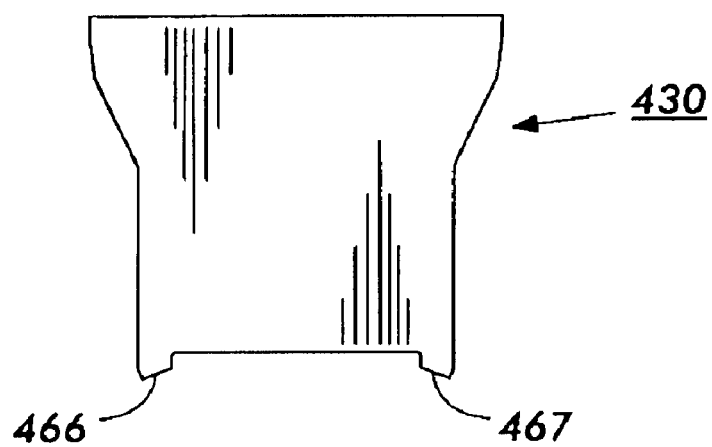
FIG. 10 is an end elevational view of yet another embodiment of an ink stick.

FIG. 9 illustrates an ink stick embodiment 330 in which the lower guide element 366 is an angled, rather than curved, protrusion from the bottom surface 352 of the ink stick body. The feed channel for receiving such an ink stick includes a lower feed channel guide rail that has a compatible or complementary shape for receiving the angled lower guide element 366. The upper ink stick guide element 68 slidingly engages an upper guide rail in the feed channel. FIG. 10 illustrates an ink stick embodiment 430 that includes two angled lower guide elements 466, 467. Such an ink stick fits into a feed channel having correspondingly shaped lower feed channel guide rails (not shown). The overall structure of such a feed channel is similar to that shown in FIG. 8, although with angular lower feed channel guide rails.

Figure 11:
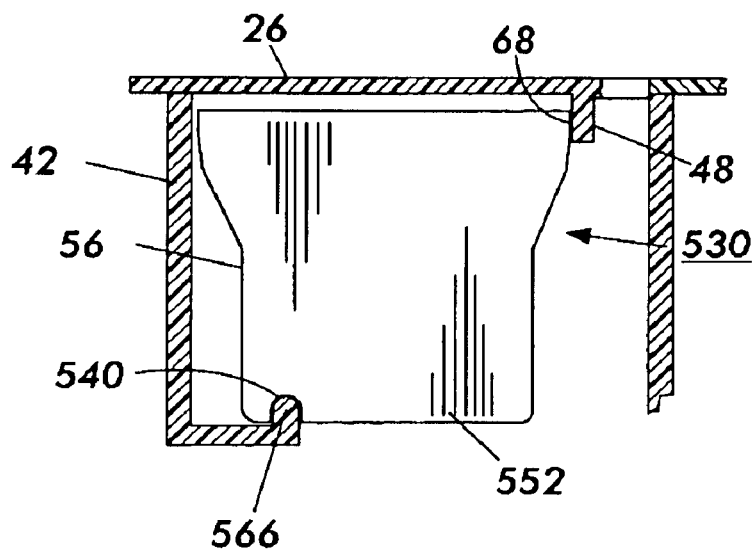
FIG. 11 is a simplified cross-sectional view of another embodiment of a feed channel, with another embodiment of a solid ink stick.

FIG. 11 shows an ink stick embodiment 530 in which the laterally offset lower ink stick guide element 566 is recessed into the bottom surface 552 of the ink stick body. The feed channel guide rail 540 in the feed channel for such an ink stick is raised, with a shape complementary to the shape of the recessed ink stick guide element 566, to slidingly engage the recessed ink stick guide element. A second feed channel guide rail 48 engages a different portion of the ink stick body to balance the ink stick in the feed channel.

Figure 12:
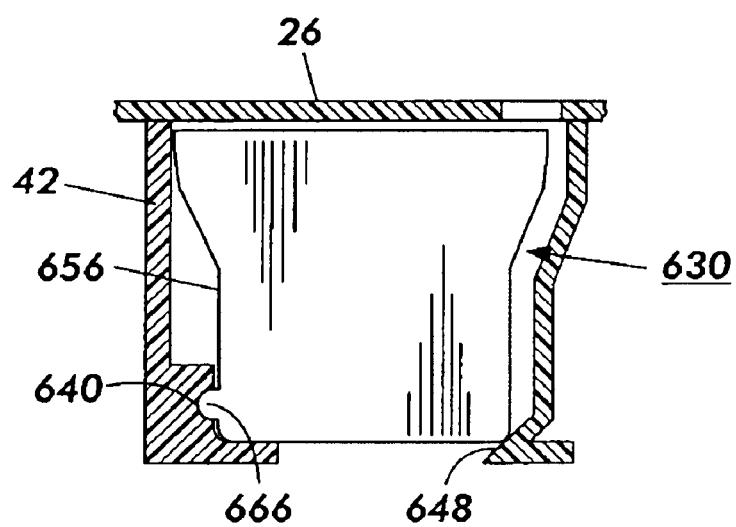
FIG. 12 is a simplified cross-sectional view of another embodiment of a feed channel, with another embodiment of a solid ink stick.
Figure 13:
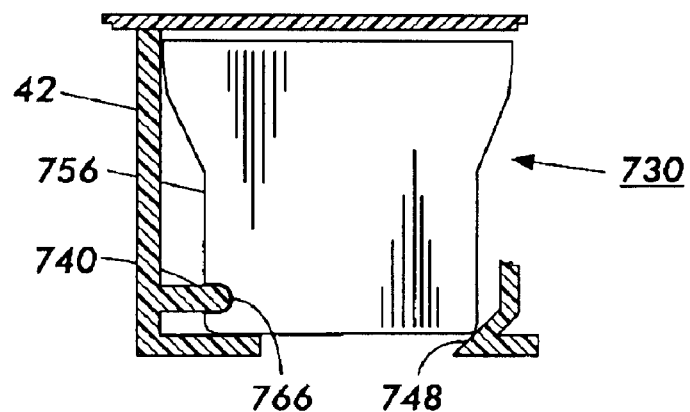
FIG. 13 is a simplified cross-sectional view of another embodiment of a feed channel, with another embodiment of a solid ink stick.

FIGS. 12 and 13 show embodiments of the ink stick 630, 730 (respectively) in which the lower ink stick guide element 666, 766 is formed on a lateral side surface of the ink stick body. The ink stick guide element is formed in the ink stick body below the vertical center of gravity. The side surface of the feed channel of the ink stick feed system for such an ink stick is correspondingly formed with a complementary feed channel guide rail 640, 740 to engage such an ink stick guide element formed on the side surface of the ink stick body. The ink stick embodiment illustrated in FIG. 12 includes a protruding ink stick guide element 666 from the side surface 656 of the ink stick body. The ink stick body tends to pivot about the line at which the ink stick guide element 666 and the feed channel guide rail 640 interact. Therefore, the feed channel guide rail 640 provides sufficient vertical resistance to the ink stick guide element to hold the ink stick in place. A second feed channel guide rail 648 in this embodiment not only helps to guide the ink stick as it moves along the feed channel, but also helps to hold the ink stick guide element 666 in the first feed channel guide rail 640. To do that, the second feed channel guide rail provides resistance in both the vertical and horizontal dimensions to movement of the second side of the ink stick body. The illustrated second feed channel guide rail 648 includes an angled element that interacts with the lower edge of the ink stick body. However, other configurations can also be used. For example, the second feed channel guide rail can have separate elements, one of which is substantially aligned with the bottom surface of the ink stick, and another of which is substantially aligned with the second side surface of the ink stick body. Some feed channel and ink stick configurations may benefit from an additional vertical support for the ink stick, in the form of an additional portion of feed channel frame supporting a portion of the bottom surface of the ink stick body.

FIG. 13 illustrates an embodiment of the ink stick in which the lower ink stick guide element 766 is recessed into the side surface 756 of the ink stick body. The side of the feed channel includes a correspondingly shaped feed channel guide rail 740. In this embodiment also, a second feed channel guide rail 748 provides resistance in both the vertical and horizontal dimensions to movement of the second side of the ink stick body. The illustrated second feed channel guide rail includes an angled element that interacts with the lower edge of the ink stick body. However, other configurations can also be used.

Figure 14:
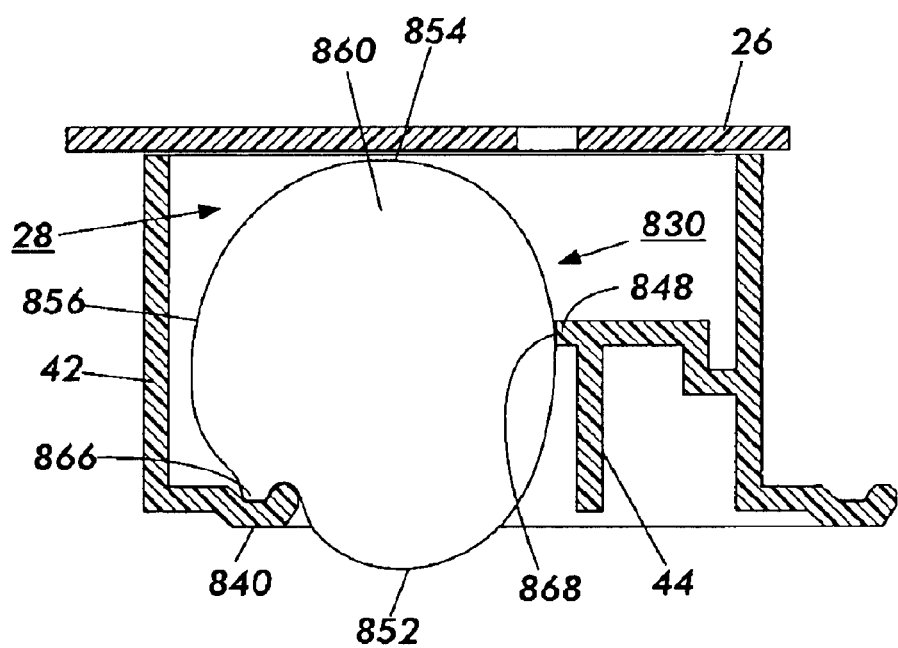
FIG. 14 is a simplified cross-sectional view of another embodiment of a feed channel, with another embodiment of a solid ink stick.
Figure 15:
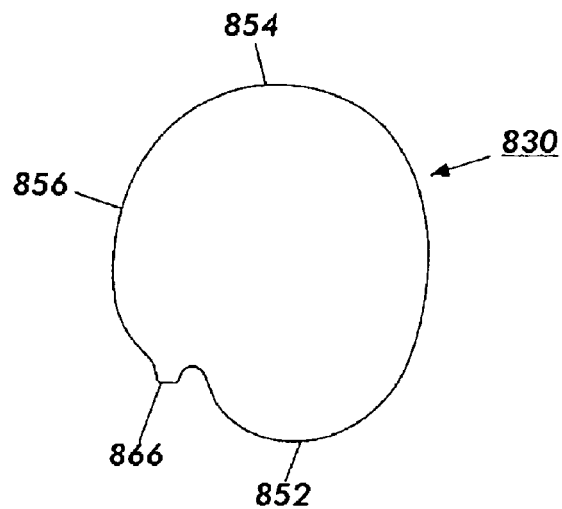
FIG. 15 is an end elevational view of the solid ink stick shown in FIG. 14.

FIGS. 14 and 15 illustrate an embodiment of the ink stick 830 in which the surfaces of the ink stick body are curved, and a feed channel for receiving such an ink stick. A first ink stick guide element 866 is formed in portion of the outer surface of the ink stick body, laterally offset from the lateral center of gravity of the ink stick body. The illustrated embodiment does not include edges at which flat surfaces meet. The curved bottom 852 of the ink stick body transitions into the curved sides 856, and the sides transition into the top 854. The ink stick body includes sufficient linear length to provide the first ink stick guide element 866 sufficient length between the ends 860 of the ink stick body to properly guide the ink stick along the feed channel guide rail 840. The feed channel has a second feed channel guide rail 848 positioned to slidingly engage a second ink stick guide element 86B. The second ink stick guide element 868 is that portion of the exterior of the ink stick body, such as a section of the side of the ink stick body, that contacts the second feed channel guide rail 848 in response to the tendency of the ink stick body to rotate about the line of interaction between the first ink stick guide element 866 and the first feed channel guide rail 840. Of course, the ink stick can also incorporate a combination of flat surfaces and curved surfaces, so that a wide variety of ink stick shapes are compatible with the present invention.

Figure 16:
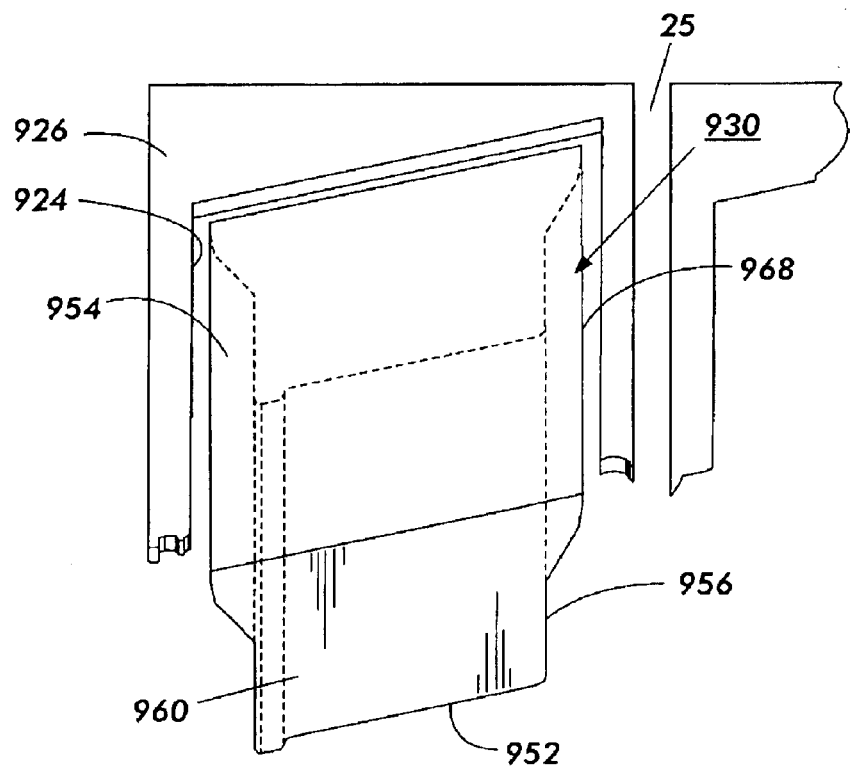
FIG. 16 is a perspective view of yet another embodiment of a solid ink stick.

FIG. 16 shows an embodiment of the ink stick 930 in which the end surfaces 960 of the ink stick body are substantially flat, but not perpendicular to the lateral side surfaces 956. Thus, the bottom and top surfaces 952, 954 of the ink stick are not rectangular. The ink stick is illustrated as it is inserted through a correspondingly shaped key plate opening 924 in a printer key plate 926.

Figure 17:
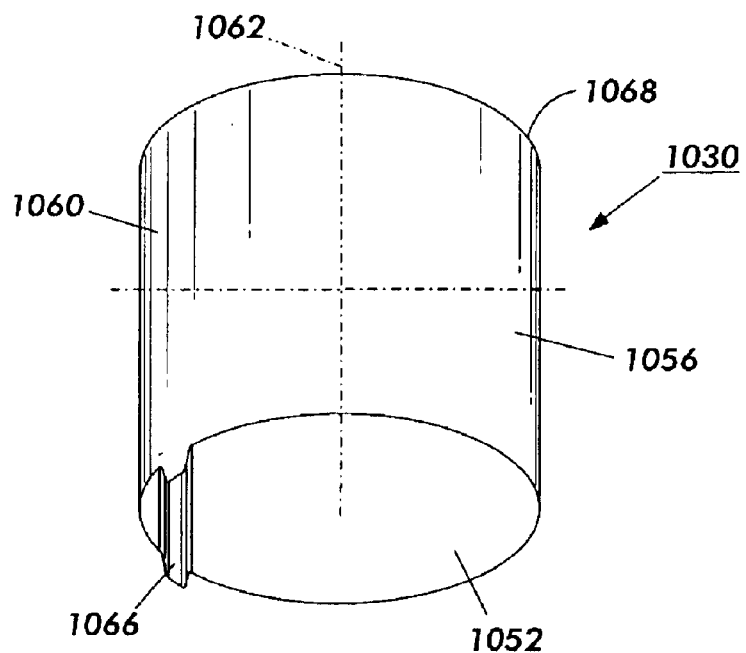
FIG. 17 is a perspective view of yet another embodiment of a solid ink stick.

FIG. 17 shows an embodiment of the ink stick 1030 in which the ink stick has a substantially cylindrical shape. This embodiment illustrates that the ends 1060 of the ink stick body and the sides 1056 do not need to meet at a corner of the ink stick body. The first ink stick guide element 1066, laterally offset from the lateral center of gravity 1062 of the primary portion of the ink stick body, extends linearly along a segment of the bottom 1052 of the ink stick body sufficient to permit the ink stick guide element 1066 to properly guide the ink stick along a feed channel guide rail in the feed channel (not shown). A portion of the outer surface of the side 1056 on the opposite side of the lateral center of gravity forms a second ink stick guide element 1068. The second ink stick guide element slidingly engages a second feed channel guide rail (not shown) in the ink feed channel of the printer.

Figure 18:
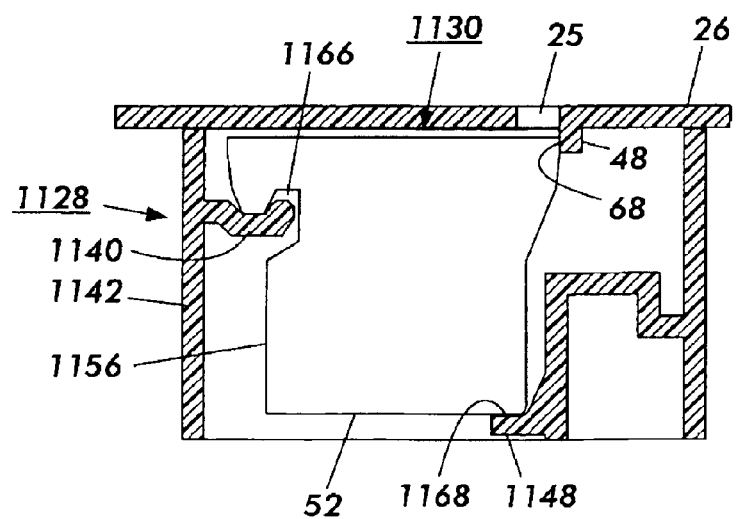
FIG. 18 is a simplified cross-sectional view of another embodiment of a feed channel, with another embodiment of a solid ink stick.

FIG. 18 shows yet another embodiment of the ink stick 1130, and corresponding feed channel 1128, to illustrate some of the numerous configurations possible. The ink stick 1130 of FIG. 18 has a first ink stick guide element 1166 formed as a protrusion from the upper portion of a lateral side surface 1156 of the ink stick body. The protruding ink stick guide element 1166 rests on and slidingly engages a first feed channel guide rail 1140 that extends from the side wall 1142 of the feed channel. In the particular embodiment illustrated, the side of the ink stick body has an indentation just below the ink stick guide element 1166, to accommodate the end of the feed channel guide rail 1140. However, such an indentation is not necessary in all instances. The ink stick body tends to rotate about the line of contact or interaction between the ink stick guide element 1166 and the first ink channel guide rail 1140, so the feed channel includes a second feed channel guide rail 1148, which interacts with a second ink stick guide element 1168. The second ink stick guide element 116B slidingly engages the second feed channel guide rail 1148. The second ink stick guide element 1068 is shown at the bottom of the ink stick body. An upper ink stick guide element 68 engaging an upper feed channel guide rail 48 can be used in addition to the second ink stick guide element 1168, or in some cases, in lieu of the second ink stick guide element 1168.

Those skilled in the art will recognize that, with the protruding type of guide element such as shown in several of the illustrated embodiments, the protrusion need not necessarily extend along the entire length of the ink stick body from the leading end surface to the trailing end surface. The protruding guide element may be formed in one or more segments, each of which extends along only a portion of the length of the ink stick body. However, a guide element formed along the entire length of the ink stick body, or at least segments formed at or near the leading (front) end surface, and at or near the trailing (rear) end surface of the ink stick body provide improved leverage for maintaining the proper orientation of the ink stick in the feed channel of the solid ink feed system.

Figure 3:
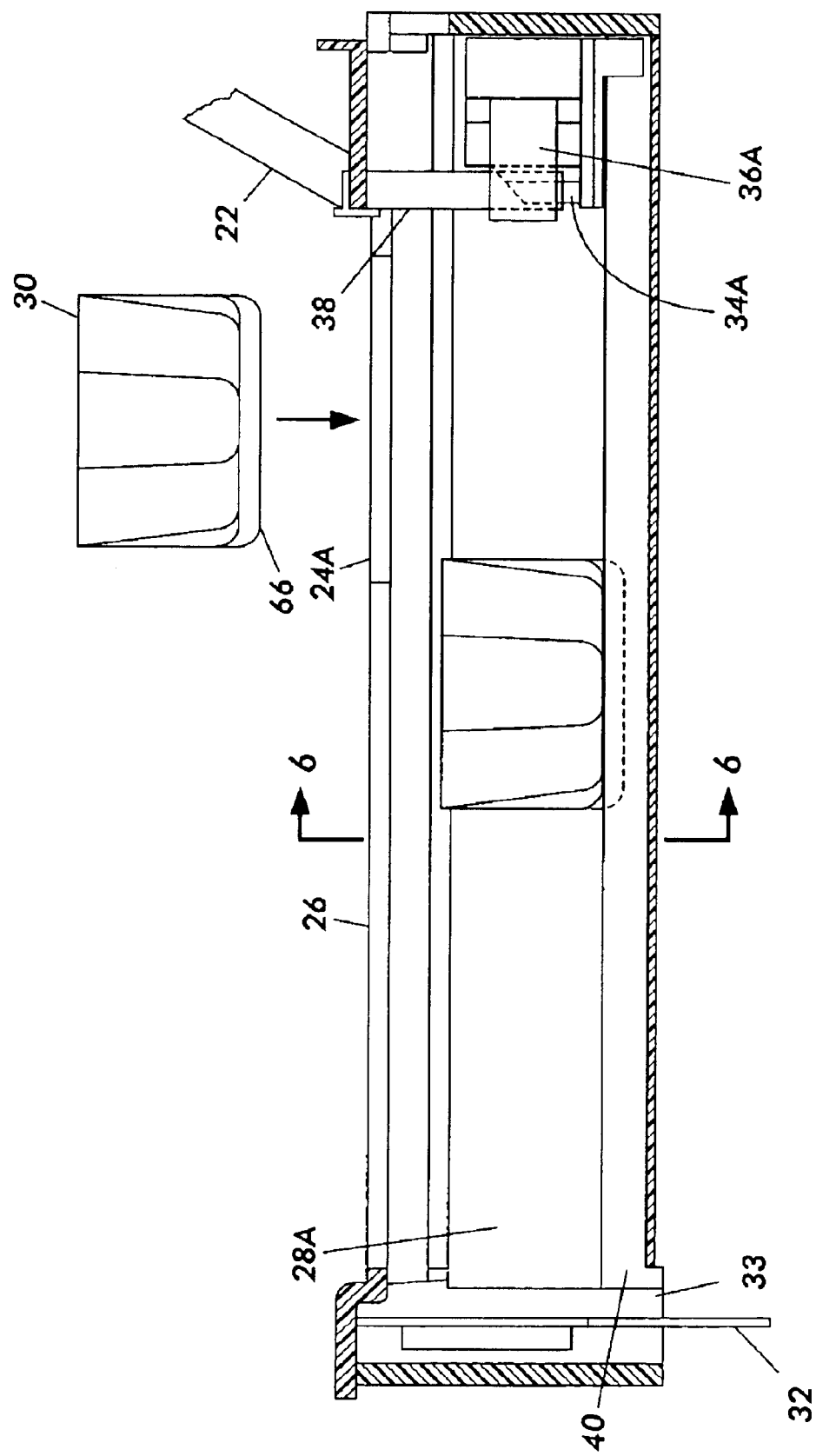
FIG. 3 is a side sectional view of one embodiment of a feed channel of a solid ink feed system, taken along line 3—3 of FIG. 2.

A method of loading an ink stick into a solid ink feed system includes inserting the ink stick through the appropriately shaped keyed opening 24A, 24B, 24C, 24D, and into the insertion end of the longitudinal feed channel, as seen in FIGS. 2 and 3. The first, lower ink stick guide element 66 is aligned with the feed channel guide rail 40 in the ink stick feed channel (see FIG. 5). The ink stick is placed in the channel with the ink stick guide element 66 on the feed channel guide rail 40 so that the contact between the ink stick guide element and the feed channel guide rail is substantially the only contact between the bottom surface of the ink stick and the feed system. When the ink stick body is released into the feed channel, the gravitational forces cause the upper ink stick guide element 68 of the ink stick body to engage the upper feed channel guide rail 48. In accordance with known techniques, the push block 34 in the feed channel pushes the ink stick along the length of the feed channel. For ink sticks similar to the embodiments illustrated in FIGS. 11 and 12, upon inserting the ink sticks into the insertion end of the feed channel, the user additionally aligns the ink stick guide element 666, 766 with the corresponding feed channel guide rail 640, 740.

Those skilled in the art will recognize that corners and edges may have radii or other non-sharp configurations, depending on various factors, including manufacturing considerations. Those skilled in the art will recognize that various modifications to the particular shapes of the ink stick body and the ink stick feed system shown in the exemplary drawings provided may be made without departing from the spirit of the invention. Therefore, the following claims should not be limited to the particular implementations illustrated and described above.

We claim:

1. An ink stick for use in a solid ink feed system of a phase change ink jet printer, wherein the feed system comprises a feed channel having a feed channel guide rail, the ink stick comprising:

an ink stick body having a lateral dimension;
a first ink stick guide element; and
a second ink stick guide element;
wherein:
the ink stick body has a lateral center of gravity along the lateral dimension of the ink stick body;
the first ink stick guide element is formed as a part of the bottom portion of the ink stick body;
the first ink stick guide element is adapted so that when the ink stick is placed in the feed channel of the solid ink feed system with the first ink stick guide element contacting the feed channel guide rail, the contact between the first ink stick guide element and the feed channel guide rail is a load-bearing contact;

the first ink stick guide element is laterally offset between a first lateral side extremity and the lateral center of gravity of the ink stick body; and the second ink stick guide element is laterally offset to a second side from the lateral center of gravity of the ink stick body, opposite the first side.

2. The ink stick of claim 1, wherein:

the ink stick body has a lateral side extremity on the second side of the lateral center of gravity of the ink stick body; and the second ink stick guide element is formed as part of the lateral side extremity.

3. An ink stick for use in a solid ink feed system of a phase change ink jet printer, the ink stick comprising:

a three dimensional ink stick body having lateral center of gravity and a vertical center of gravity; and guide means formed in the ink stick body for forming a load-bearing contact with a longitudinal feed channel in the solid ink feed system and for guiding the ink stick along the longitudinal feed channel;

wherein the guide means is asymmetrical about the lateral center of gravity; and wherein the guide means is asymmetrical about the lateral center of gravity.

4. The ink stick of claim 3, wherein the solid ink feed system includes a feed channel for receiving an ink stick, and wherein the ink stick guide means comprises:

first guide means for guiding the ink stick body along a first portion of the feed channel; and second guide means for guiding a portion of the ink stick body along a second portion of the feed channel.

5. The ink stick of claim 4, wherein:

the first guide means comprises a first ink stick guide element formed in the ink stick body;

the second guide means comprises a second ink stick guide element formed in the ink stick body;

the first guide element is on a first side of the lateral center of gravity of the ink stick;

the second guide element is on the opposite side of the lateral center of gravity of the ink stick;

the first ink stick guide element is configured to engage a first guide rail in the feed channel; and the second ink stick guide element is configured to engage a second guide rail in the feed channel.

6. The ink stick of claim 5, wherein:

the first ink stick guide element is configured to slidingly engage the first guide rail in the feed channel; and the second ink stick guide element is configured to slidingly engage the second guide rail in the feed channel.

7. The ink stick of claim 6, wherein:

the ink stick body has first and second opposed lateral extremities; and the first ink stick guide element is closer to the first lateral side of the ink stick body than to the second lateral extremity.

8. The ink stick of claim 7, wherein the second ink stick guide element is closer to the second lateral extremity of the ink stick body than to the first lateral extremity.

9. The ink stick of claim 8, wherein the second ink stick guide element is formed in the second lateral extremity of the ink stick body.

10. The ink stick of claim 4, wherein:

the first guide element is formed in the ink stick body below the vertical center of gravity; and the second guide element is formed in the ink stick body above the vertical center of gravity.

11. The ink stick of claim 10, wherein:

the first ink stick guide element is formed below the vertical center of gravity of the ink stick body and the second ink stick guide element is formed above the vertical center of gravity of the ink stick body.

12. The ink stick of claim 10, wherein:

the first guide element is configured to slidingly engage a first guide rail in the feed channel; and the second guide element is configured to slidingly engage a second guide rail in the feed channel.

13. The ink stick of claim 12, wherein:

the first guide element is configured to engage the first guide rail in a lower portion of the feed channel; and the second guide element is configured to engage the second guide rail in an upper portion of the feed channel.

14. The ink stick of claim 13, wherein:

the ink stick body comprises a bottom surface;

the first ink stick guide element is formed in the bottom surface of the ink stick body.

15. The ink stick of claim 14, wherein:

the ink slick body has a lateral center of gravity;

the ink stick body has first and second lateral extremities on opposite sides of the lateral center of gravity;

the first ink stick guide element is closer to one lateral extremity of the ink stick body than to the opposite lateral extremity.

16. The ink stick of claim 15, wherein:

the second ink stick guide element is formed in the second lateral extremity of the ink stick body.

17. The ink stick of claim 16, wherein:

the ink stick body has a vertical center of gravity; and the second ink stick guide element is formed in the second lateral extremity of the ink stick body above the vertical center of gravity.

18. An ink stick for use in a solid ink feed system of a phase change ink printer, the ink stick comprising:

a body having a generally bottom surface; and a guide element in the bottom surface of the ink stick for interacting with a guide rail in the ink stick loader to form a load-bearing contact with the solid ink feed system, and to guide the ink stick along a defined path in solid ink feed system;

wherein the guide element is positioned so that the weight of the body is offset to one side of the guide element.

19. A method of loading an ink stick into a solid ink feed system of a phase change ink jet printer, the method comprising:

providing an ink stick, wherein the ink stick includes:

a bottom surface;

a lateral center of gravity; and a non-planar guide element in the bottom surface, laterally offset from the lateral center of gravity;

aligning the guide element with a feed channel guide rail in the feed system;

inserting the ink stick into the feed system; and resting the guide element on the feed channel guide rail so that contact between the guide element and the feed channel guide rail is a load-bearing contact between the bottom surface of the ink stick and the feed system.

20. The method of claim 19, wherein:

providing the ink stick additionally comprises providing the ink stick with a second guide element laterally offset from the lateral center of gravity on the opposite side of the lateral center of gravity from the first guide element; and the method additionally comprises resting the second ink stick guide element against a second feed channel guide rail in the feed system.

21. The method of claim 19, wherein the contact between the guide element and the feed channel guide rail is substantially the only contact between the bottom surface of the ink stick and the feed system.

22. A solid ink feed system for a phase change ink jet printer, the feed system comprising:

a longitudinal feed channel;

a first feed channel guide rail in the feed channel;

wherein the first guide rail is at a first elevation in the feed channel relative to gravity;

wherein the width of the feed channel guide rail is substantially less than the width of the feed channel; and wherein the first guide rail is substantially offset from the lateral center of the feed channel;

a second feed channel guide rail in the feed channel;

wherein the second guide rail is at a second elevation in the feed channel relative to gravity, and the second elevation is different from the first elevation;

wherein the second guide rail is offset from the lateral center of the feed channel; and wherein the first and second guide rails are offset on opposite sides of the center of the feed channel; and an ink stick having at least a bottom surface;

wherein the ink stick has a first longitudinal guide element substantially offset in one direction from the lateral center of the ink stick;

wherein the shape of the first guide element in the ink stick and the shape of the first guide rail in the feed channel are substantially compatible with one another so that when the ink stick is inserted into the feed channel, the first ink stick guide element rests on the first guide rail of the feed channel to form a load-bearing contact between the first ink stick guide element and the first guide rail of the feed channel; and wherein the ink stick has a second guide element substantially offset in a second direction from the lateral center of ink stick, opposite the first direction.

23. The solid ink teed system of claim 22, wherein:

the ink stick has a vertical center of gravity; and the second guide element is above the vertical center of gravity of the ink stick.

24. The solid ink feed system of claim 23, wherein:

the first guide element interacts with the guide rail with a vertical force; and the first guide element interacts with the guide rail with a lateral force.

25. The solid ink feed system of claim 23, wherein:

the first guide rail is oriented substantially perpendicular to gravity; and the second guide rail is oriented substantially perpendicular to gravity.

26. An ink stick for use in a solid ink feed system of a phase change ink printer, wherein the solid ink feed system includes a shaped guide rail, the ink stick comprising:

a three dimensional ink stick body having a bottom surface and a plurality of side surfaces that intersect the bottom surface; and a shaped guide element formed in the bottom surface of the ink stick body;

wherein at least one of the side surfaces has a predetermined non-planar key shape so that the ink stick can be inserted in a first direction into the solid ink teed system through an opening having a corresponding non-planar key shape;

wherein the shaped guide element is shaped for guiding the ink stick in a second direction along a defined path in the ink stick feed system;

wherein the second direction is substantially perpendicular to the first direction;

wherein the shaped guide element has a shape that complements the shape of the shaped guide ram in the sold ink feed system and adapted so that when the ink stick is placed in the solid ink feed system, the shaped guide element forms a load-bearing contact with the shaped guide rail of the solid ink feed system; and wherein the ink stick has a lateral center of gravity between two of the side surfaces;

wherein the shaped guide element is formed on one side of the lateral center of gravity;

wherein the ink stick has a vertical center of gravity above the bottom surface.

27. The ink stick of claim 26:

additionally comprising a second guide element formed in the ink stick body;

wherein the second guide element is formed on the opposite side of the lateral center of gravity.

28. The ink stick of claim 26:

additionally comprising a second guide element formed in the ink stick body;

wherein the second guide element is formed above the vertical center of gravity of the ink stick.

* * * * *

UNITED STATES PATENT AND TRADEMARK OFFICE
CERTIFICATE OF CORRECTION

PATENT NO. : 6,840,612 B2
DATED : January 11, 2005
INVENTOR(S) : Brent R. Jones et al.

It is certified that error appears in the above-identified patent and that said Letters Patent is hereby corrected as shown below:

<u>Column 11,</u>
Lines 28-29, should read -- the vertical center of gravity -- rather than "the lateral center of gravity".

<u>Column 14,</u>
Line 33, should read -- rail -- rather than "ram".

Signed and Sealed this

Fifth Day of July, 2005

JON W. DUDAS
*Director of the United States Patent and Trademark Office*